Oct. 3, 1961  R. F. BADDOUR  3,002,922
APPARATUS AND METHODS FOR CONTINUOUS ION EXCHANGE
Filed Jan. 29, 1959

INVENTOR
Raymond F. Baddour
his attorneys

3,002,922
APPARATUS AND METHODS FOR CONTINUOUS ION EXCHANGE
Raymond F. Baddour, % Hagan Chemicals & Controls Inc., Belmont, Mass.
Filed Jan. 29, 1959, Ser. No. 789,946
9 Claims. (Cl. 210—33)

This invention relates to apparatus and method for continuous ion exchange and particularly to a continuous countercurrent ion exchange apparatus and method.

The general utility of ion exchange materials and particularly of the ion exchange resins has produced a need for equipment capable of handling such resins in continuous fashion. The great variety of possible uses, ranging from water softening to extraction of metalliferous materials from ores is extremely broad. Ion exchange systems using ion exchange materials have been used for many years in what are the equivalent of batch systems. While these have been satisfactory, they have severely limited the ultimate usefulness and versatility of ion exchange resins. For example, ion exchange materials have long been used in water softening practices where water to be treated is passed through the ion exchange bed until the bed is substantially exhausted. The water is then shut off from the system and salt water for regeneration is pumped into the ion exchange bed. When regeneration is completed, the salt water is removed from the bed, the bed is purged and it is again in condition for operation until exhausted. The deficiencies of such batch systems are obvious. However, no simple, satisfactory continuous ion exchange method or apparatus has been available.

The present invention provides apparatus for continuous ion exchange preferably in the form of a continuous bed of ion exchange material, a treating zone communicating with said bed and relatively movable with respect thereto for introducing and removing fluid to be treated into said bed, a regenerating zone communicating with said bed and relatively movable with respect thereto for introducing and removing regenerating fluid to said bed, said regenerating zone being spaced from the treating zone and means acting to relatively move the bed and the treating and regenerating zones. Preferably, the continuous bed of ion exchange material is in the form of a circle mounted for rotation about its axis. Preferably, the treating zone and the regenerating zone are spaced on diametrically opposite sides of said bed and are fixed whereby the bed moves relatively to them. Means for introducing a washing liquid between the treating and regenerating zones are provided whereby wash water or similar fluid may be introduced between the regenerating zone and the treating zone to maintain a pressure sufficient to prevent intermingling of the fluid being treated and the regenerating fluid.

In the foregoing general description, I have set out certain purposes, objects and advantages of this invention. Other purposes, objects and advantages of the invention will be apparent from a consideration of the following description and the accompanying drawings illustrating a present preferred form of my invention.

Figure 1:
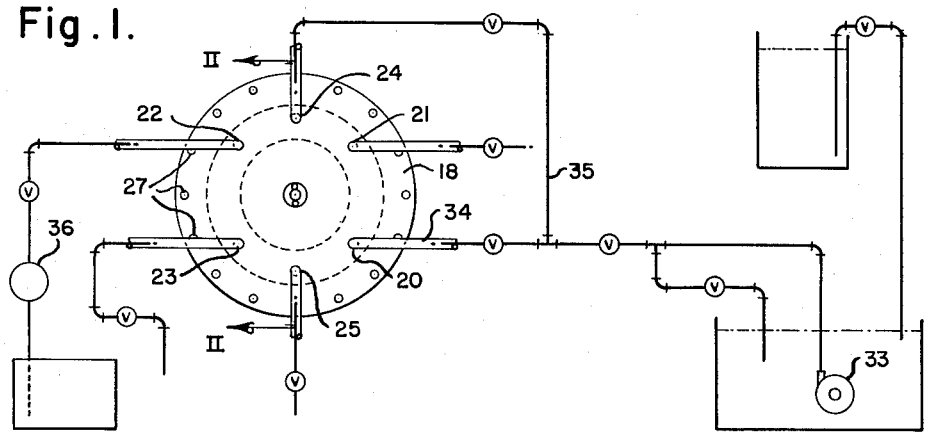
FIGURE 1 is a side elevation partly diagrammatical of a continuous ion exchange apparatus according to my invention.

Referring to the drawings, I have illustrated an ion exchange chamber 10 in the form of a circle mounted on a drive shaft 11 and drivingly engaged therewith by means of drive pin 12 and slot 13. An annular recess 14 is provided adjacent the outer periphery of the circle. This recess 14 is filled with ion exchange material 15 and covered by a Teflon screen 16 recessed in annular recess 17 about the recess 14. The chamber 10 is mounted for rotation within an outer case made up of a body portion 18 having a recess 19 into which the chamber 10 fits. The body portion 18 is provided with an inlet opening 20 and an outlet opening 21 spaced apart for introducing and removing fluid to be treated to the recess 14. An inlet opening 22 and an outlet opening 23 for introducing and removing regenerating fluid into recess 14 are provided substantially diametrically opposed to the inlet and outlet openings for the fluid to be treated. An inlet 24 is provided between the treating zone formed between inlet 20 and outlet 21 and the regenerating zone formed by inlet 22 and outlet 23 whereby wash fluid can be introduced to prevent intermingling of treating fluid and regenerating fluid. An opening 25 diametrically opposed to inlet 24 is provided for drainage or alternatively for the introduction of an additional flow of wash or counterbalancing fluid. A cover 26 is adapted to fit over the body portion 18 and is held in position by bolts 27 which pass through openings 28 in the body portion and 29 in the cover. A rubber O-ring 30 is provided in groove 31 between the cover 26 and body portion 18 to insure a seal therebetween. Drive means 32 are connected to the shaft 11 for rotating the chamber within the outer case. Pump means 33 are provided for delivering water to be treated through lines 34 and 35 to inlets 20 and 24. A second pump 36 is provided for delivering brine to the inlet 22 for regeneration of the brine exchange resin 15.

Figure 2:
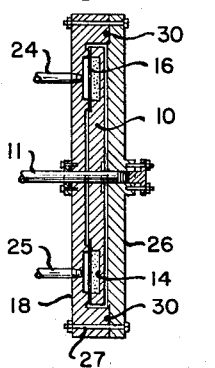
FIGURE 2 is a section on the line II—II of FIGURE 1.
Figure 3:
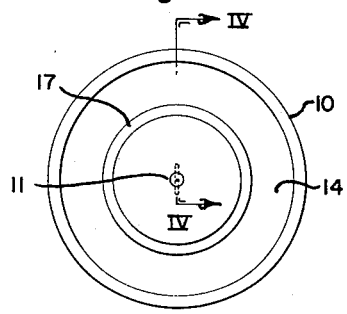
FIGURE 3 is a top plan view of the ion exchange chamber of FIGURES 1 and 2.
Figure 4:
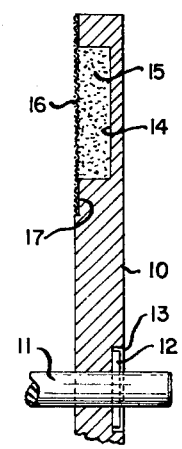
FIGURE 4 is an enlarged partial section on the line IV—IV of FIGURE 3.
Figure 5:
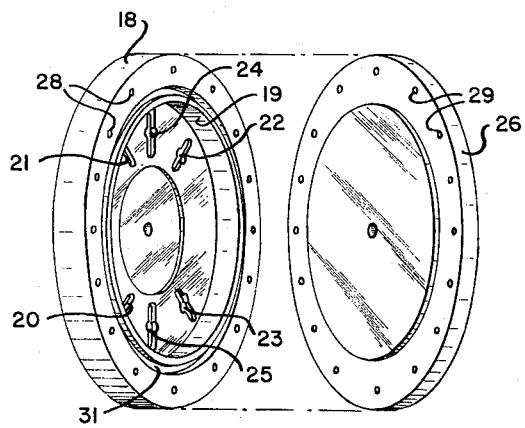
FIGURE 5 is an exploded isometric view of the outer case of the apparatus of FIGURES 1 and 2.
Figure 6:
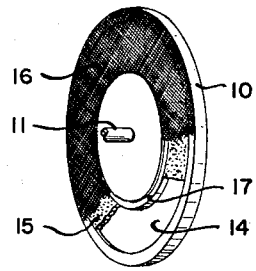
FIGURE 6 is an isometric view partly broken away of the ion exchange chamber.

The effectiveness of this apparatus is illustrated by the following example using the apparatus illustrated in FIGURES 1 through 6. A raw water of total hardness of 29.8 grains per gallon was continuously fed into inlets 20 and 24. Brine made by dissolving 250 grams of salt in 3800 millimeters of water was pumped through inlet 22. The chamber 10 was rotated at .0357 r.p.m. The time, rate of brine feed, rate of brine effluent and the rate of treated water effluent together with the hardness of the treated water appear in Table I hereinbelow.

Table 1

| Time | Brine Feed, Ml./Min. | Brine Effluent, Ml./Min. | Water Effluent, Ml./Min. | Water Effluent Tests, Total Hardness, Gr./Gal. |
|---|---|---|---|---|
| 0:00 | ------ | 44 | 204 | 1.2 |
| :10 | 3.0 | 44 | 264 | ------ |
| :20 | 2.7 | 40 | 192 | 1.7 |
| :30 | 2.8 | 40 | 212 | ------ |
| :40 | 2.8 | 40 | 220 | 3.3 |
| :50 | 2.8 | 40 | 216 | ------ |
| 1:00 | 2.9 | 40 | 232 | 2.3 |
| 1:10 | 3.0 | 44 | 216 | ------ |
| 1:20 | 3.0 | 48 | 214 | 0.5 |
| 1:30 | 2.6 | 44 | 220 | ------ |
| 1:40 | 3.0 | 44 | 214 | 0.6 |
| 1:50 | 2.9 | 42 | 220 | ------ |
| 2:00 | 2.8 | 44 | 230 | 2.1 |
| 2:10 | 3.0 | 44 | 220 | ------ |
| 2:20 | 3.0 | 40 | 216 | 2.4 |
| 2:30 | 3.1 | 42 | 212 | ------ |
| 2:40 | 3.0 | 44 | 220 | 1.7 |
| 2:50 | 3.3 | 42 | 220 | ------ |
| 3:00 | 2.9 | 44 | 218 | 1.9 |
| 3:10 | 2.9 | 42 | 214 | ------ |
| 3:20 | 2.9 | 42 | 208 | 1.4 |
| 3:30 | 2.9 | 42 | 206 | ------ |
| 3:40 | 2.9 | 40 | 218 | 3.4 |
| 3:50 | 2.8 | 40 | 206 | ------ |
| 4:00 | 3.0 | 40 | 212 | 3.2 |
| 4:10 | 2.8 | 40 | 224 | ------ |
| 4:20 | 2.7 | 42 | 208 | 1.6 |
| 4:30 | 2.7 | 42 | 208 | ------ |
| 4:40 | 2.9 | 42 | 216 | 2.7 |
| 4:50 | 2.9 | 44 | 216 | ------ |
| 5:00 | 2.9 | 40 | 220 | 4.0 |
| 5:10 | 2.9 | 42 | 210 | ------ |
| 5:20 | 2.9 | 40 | 206 | 2.0 |
| 5:30 | 2.8 | 40 | 200 | ------ |
| [1] 330 | [2] 2.9 | [2] 42 | [2] 216 | [2] 2.1 |

[1] Minutes.
[2] Averages.

The foregoing example shows the manner in which the method and apparatus of this invention are used. Calculations show that the efficiency of the salt in the foregoing example is about 72% during this run in which the chamber made approximately twelve revolutions.

While I have illustrated and described a present preferred apparatus and practice of my invention, it will be understood that this invention may be otherwise practiced within the scope of the following claims.

I claim:

1. Apparatus for continuous ion exchange comprising a continuous bed of ion exchange material, a treating zone communicating with said bed and relatively movable with respect thereto for introducing and removing fluid to be treated into a first portion of said bed, a regenerating zone communicating with said bed and relatively movable with respect thereto for introducing and removing regenerating fluid into a second portion of said bed, said regenerating zone being spaced from the treating zone and means acting to relatively move the bed and the treating and regenerating zones.

2. Apparatus for continuous ion exchange comprising a continuous bed of ion exchange material, a treating zone communicating with said bed and relatively movable with respect thereto for introducing and removing fluid to be treated into a first portion of said bed, a regenerating zone communicating with said bed and relatively movable with respect thereto for introducing and removing regenerating fluid into a second portion of said bed, said regenerating zone being spaced from the treating zone, inlet means spaced between said treating zone and said regenerating zone for introducing fluid pressure into the bed between said zones and means acting to relatively move the bed and the treating and regenerating zones.

3. Apparatus for continuous ion exchange comprising a continuous bed of ion exchange material, a treating zone communicating with said bed and relatively movable with respect thereto for introducing and removing fluid to be treated into a first portion of said bed, said treating zone having spaced inlet and outlet ports communicating with the bed, a regenerating zone communicating with said bed and relatively movable with respect thereto for introducing and removing regenerating fluid into a second portion of said bed, said regenerating zone being spaced from the treating zone and having spaced inlet and outlet ports communicating with the bed and means acting to relatively move the bed and the treating and regenerating zones.

4. Apparatus for continuous ion exchange comprising a continuous bed of ion exchange material, a treating zone communicating with said bed and relatively movable with respect thereto for introducing and removing fluid to be treated into a first portion of said bed, said treating zone having spaced inlet and outlet ports communicating with the bed, a regenerating zone communicating with said bed and relatively movable with respect thereto for introducing and removing regenerating fluid into a second portion of said bed, said regenerating zone being spaced from the treating zone and having spaced inlet and outlet ports communicating with the bed, inlet means spaced between said treating zone and said regenerating zone for introducing fluid pressure into the bed between said zones, and means acting to relatively move the bed and the treating and regenerating zones.

5. Apparatus for continuous ion exchange comprising a continuous rotatable annular bed of ion exchange material, a treating zone communicating with said bed and relatively movable with respect thereto for introducing and removing fluid to be treated into a first portion of said bed, a regenerating zone communicating with said bed and relatively movable with respect thereto for introducing and removing regenerating fluid into a second portion of said bed, said regenerating zone being spaced from the treating zone, inlet means spaced between said treating zone and said regenerating zone for introducing fluid pressure into the bed between said zones and means acting on the bed to rotate the bed with respect to the treating and regenerating zones.

6. Apparatus for continuous ion exchange comprising a continuous annular bed of ion exchange material, a treating zone communicating with said bed and relatively movable with respect thereto for introducing and removing fluid to be treated into a first portion of said bed, said treating zone having spaced inlet and outlet ports communicating with the bed, a regenerating zone communicating with said bed and relatively movable with respect thereto for introducing and removing regenerating fluid into a second portion of said bed, said regenerating zone being spaced from the treating zone and having spaced inlet and outlet ports communicating with the bed and means acting to relatively move the bed and the treating and regenerating zones.

7. Apparatus for continuous ion exchange comprising a continuous annular bed of ion exchange material, a treating zone communicating with said bed and relatively movable with respect thereto for introducing and removing fluid to be treated into a first portion of said bed, said treating zone having spaced inlet and outlet ports communicating with the bed, a regenerating zone communicating with said bed and relatively movable with respect thereto for introducing and removing regenerating fluid into a second portion of said bed, said regenerating zone being spaced from the treating zone and having spaced inlet and outlet ports communicating with the bed, inlet means spaced between said treating zone and said regenerating zone for introducing fluid pressure into the bed between said zones, and means acting to relatively move the bed and the treating and regenerating zones.

8. Apparatus for continuous ion exchange comprising a continuous annular bed of ion exchange material, a treating zone communicating with said bed and relatively movable with respect thereto for introducing and removing fluid to be treated into a first portion of said bed, said treating zone having spaced inlet and outlet ports communicating with the bed, means continuously delivering fluid to be treated to said inlet port, a regenerating zone communicating with said bed and relatively movable with respect thereto for introducing and removing regenerating fluid into a second portion of said bed, said regenerating zone being spaced from the treating zone and having spaced inlet and outlet ports communicating with the bed, means continuously delivering regenerating fluid to said inlet port, inlet means spaced between said treating zone and said regenerating zone for introducing fluid pressure into the bed between said zones, and means acting to relatively move the bed and the treating and regenerating zones.

9. Method of continuous ion exchange comprising the steps of continuously moving a continuous bed of ion exchange material, introducing and removing fluid to be treated at spaced points along the path of travel of said bed, introducing and removing regenerating fluid at spaced points along the path of travel of said bed spaced from the points of introducing and removing fluid to be treated and introducing a fluid pressure into the bed at a point intermediate between the fluid to be treated and the regenerating fluid.

References Cited in the file of this patent
UNITED STATES PATENTS

| | | |
|---|---|---|
| 1,926,505 | Turner | Sept. 12, 1933 |
| 2,556,480 | Miller | June 12, 1951 |
| 2,595,627 | Barnebl et al. | May 6, 1952 |

FOREIGN PATENTS

| | | |
|---|---|---|
| 506,820 | Great Britain | 1939 |